United States Patent [19]

Neeper

[11] Patent Number: 5,288,169

[45] Date of Patent: Feb. 22, 1994

[54] VENTILATION OF POROUS MEDIA

[75] Inventor: Donald A. Neeper, Los Alamos, N. Mex.

[73] Assignee: The United States of America as represented by the United States Department of Energy, Washington, D.C.

[21] Appl. No.: 829,346

[22] Filed: Jan. 31, 1992

[51] Int. Cl.$^5$ .............................................. B09B 1/00
[52] U.S. Cl. ...................................... 405/128; 405/258
[58] Field of Search .................... 405/129, 37, 44, 36, 405/269, 263, 258

[56] References Cited

U.S. PATENT DOCUMENTS

| | | | |
|---|---|---|---|
| 4,593,760 | 6/1986 | Visser et al. | |
| 4,730,672 | 3/1988 | Payne | |
| 4,732,510 | 3/1988 | Louis | 405/269 |
| 4,842,448 | 6/1989 | Koerner et al. | |
| 4,895,085 | 1/1990 | Chips | |
| 4,945,988 | 8/1990 | Payne et al. | 405/128 X |
| 4,957,394 | 9/1990 | Jarnagin et al. | 405/128 |
| 4,983,364 | 1/1991 | Buck et al. | |
| 5,009,266 | 4/1991 | Dieter | |
| 5,013,183 | 5/1991 | Eriksson et al. | 405/128 X |
| 5,032,042 | 7/1991 | Schuring et al. | |
| 5,067,852 | 11/1991 | Plunkett | |
| 5,076,727 | 12/1991 | Johnson et al. | 405/128 |

OTHER PUBLICATIONS

Slutsky et al., "Effective Pulmonary Ventilation with Small-Volume Oscillations at High Frequency", Science, vol. 209, pp. 609-611 (Aug. 1, 1980).
D. R. Scotter et al., "Dispersion Resulting from Sinusoidal Gas Flow in Porous Materials", Soil Science, vol. 104, No. 4, pp. 306-308 (1967).
"Hydrocarbons Vaporized with Pulsed Air Flow", WRC Newsletter, vol. 5, No. 4, pp. 2-3 (Jul. 1990), Texas Tech. University, Lubbock, Tex.
E. J. Watson, "Diffusion in Oscillatory Pipe Flow", J. Fluid Mech., vol. 133, pp. 233-244 (1983).
C. H. Joshi et al., "An Experimental Study of Gas Exchange in Laminar Oscillatory Flow", J. Fluid Mech., vol. 133, pp. 245-254 (1983).
Ground Water Management, Book 5 of the Series, "Proceedings of the Fifth National Outdoor Action Conference on Aquifer Restoration, Ground Water Monitoring, and Geophysical Methods", May 13-16, 1991, Las Vegas, Nev.
U. H. Kurzweg et al., "Enhanced Dispersion in Oscillatory Flows", Phys. Fluids, vol. 27, No. 5, pp. 1046-1048 (May 1984).
U. H. Kurzweg et al., "Diffusional Separation of Gases by Sinusoidal Oscillations", Phys. Fluids, 30, No. 4, pp. 1023-1025 (Apr. 1987).
Los Alamos National Laboratory, Research Highlights 1990, LALP-90-38 (Feb. 1991).
Proceedings of the Conference on Petroleum Hydrocarbons and Organic Chemicals in Ground Water: Prevention, Detection and Restoration, Nov. 15-17, 1989, Houston, Tex.

Primary Examiner—Dennis L. Taylor
Assistant Examiner—J. Russell McBee
Attorney, Agent, or Firm—Richard J. Cordovano; Paul D. Gaetjens; William R. Moser

[57] ABSTRACT

Methods for distributing gases throughout the interstices of porous materials and removing volatile substances from the interstices of porous materials. Continuous oscillation of pressures and flows results in increased penetration of the interstices by flowing gases and increased transport of gaseous components out of the interstices. The invention is particularly useful in soil vapor extraction.

8 Claims, 5 Drawing Sheets

VENTILATION OF POROUS MEDIA

This invention relates to fluid flow in porous media. This invention is the result of a contract with the Department of Energy (Contract No. W-7405-ENG-36).

BACKGROUND OF THE INVENTION

This invention is useful in infusing a porous material with a gas, which may be comprised of a volatile substance or suspended solids, and removing a gas from a porous substance. A significant application of the invention is in soil vapor extraction (SVE), which is also referred to as soil venting, air stripping, vacuum extraction, etc. The invention will be explained primarily in terms of this application, but it is to be understood that there are numerous other applications for use of the inventive method. For example, the invention may be used in drying gypsum wallboard material and bioremediation, where microbes are used to destroy contaminants in soil or other porous materials and oxygen must be added to maintain the microbe population.

SVE is often the preferred method to clean up soil which is contaminated with volatile materials. In numerous locations, chemicals such as gasoline and other hydrocarbons have leaked into the earth or have been dumped into the earth. These chemicals, often referred to as volatile organic compounds (VOC's), migrate down through the earth and contaminate groundwater, imperiling water used by much of the population. It is generally agreed that it is preferable to remove the contaminants before they reach the water table. In its basic form, SVE involves drilling one or more wells, installing solid well casing above the contaminated soil and porous well casing where a well passes through the contaminated soil, and using a vacuum source to reduce the pressure in the well or wells. The vacuum source is usually an industrial blower having its suction side connected to the well by piping. VOC's contaminating the soil are drawn out of the soil as a result of reduced pressure in the well and are passed into means for capturing or destroying them, such as activated carbon, on which they are absorbed. VOC's in the soil in liquid form are vaporized. Air from the atmosphere usually passes through the contaminated soil into the well and carries VOC's to the vacuum source. Air may be blown into an air supply well having a porous casing, using a blower or other pressure source, to increase the flow of air which sweeps VOC's from the soil. A steady flow or an intermittent flow of gas is used. The present invention provides methods in which oscillatory pressures and flows are used to enhance the extraction rate of volatile substances.

Since information on how to conduct SVE can be easily found, it is not necessary to discuss it in detail herein. U.S Pat. No. 4,593,760 (Visser et al.) teaches a basic method of SVE. U.S. Pat. No. 4,730,672 (Payne) teaches an SVE process in which a vacuum source is used to remove air and VOC's from a borehole, the VOC's are separated from the air, and the air is recycled back into the ground by means of a pressure source to pick up more VOC's; the present invention can be employed in the practice of this process by applying oscillation to both the flow of gas into the ground and the flow out of the soil or to just one of the flows. The use of both injection wells and extraction wells is also discussed in U.S. Pat. No. 5,032,042 (Schuring et al.). U.S. Pat. No. 5,067,852 (Plunkett) teaches a process for removing contaminants from excavated material; the present invention may be used with this process. The present invention may also be used with the process of U.S. Pat. No. 4,842,448 (Koerner et al.), which involves placing an impermeable barrier over a contaminated area and reducing the pressure under the barrier to draw out VOC's. U.S. Pat. No. 4,895,085 (Chips) and 4,983,364 (Buck et al.) deal with separating VOC's from an air stream pulled from an extraction well.

SUMMARY OF THE INVENTION

This invention is methods for distributing gases throughout the interstices of porous materials and removing volatile substances from the interstices of porous materials. Continuous oscillation of pressures and flows results in increased penetration of the interstices by flowing gases and increased transport of gaseous components out of the interstices. The invention is particularly useful in soil vapor extraction.

An embodiment of the invention is useful in a process for removing volatile substances from the interstices of porous materials by flowing a gas through a porous mass of material, where the inventive improvement consists of establishing a base gas flow rate which is effective to remove volatile substances and varying the gas flow rate in a series of predetermined periodic cycles, where the gas flow rate is equal to the base rate at the beginning and end of each cycle.

DETAILED DESCRIPTION OF THE INVENTION

Figure 1:
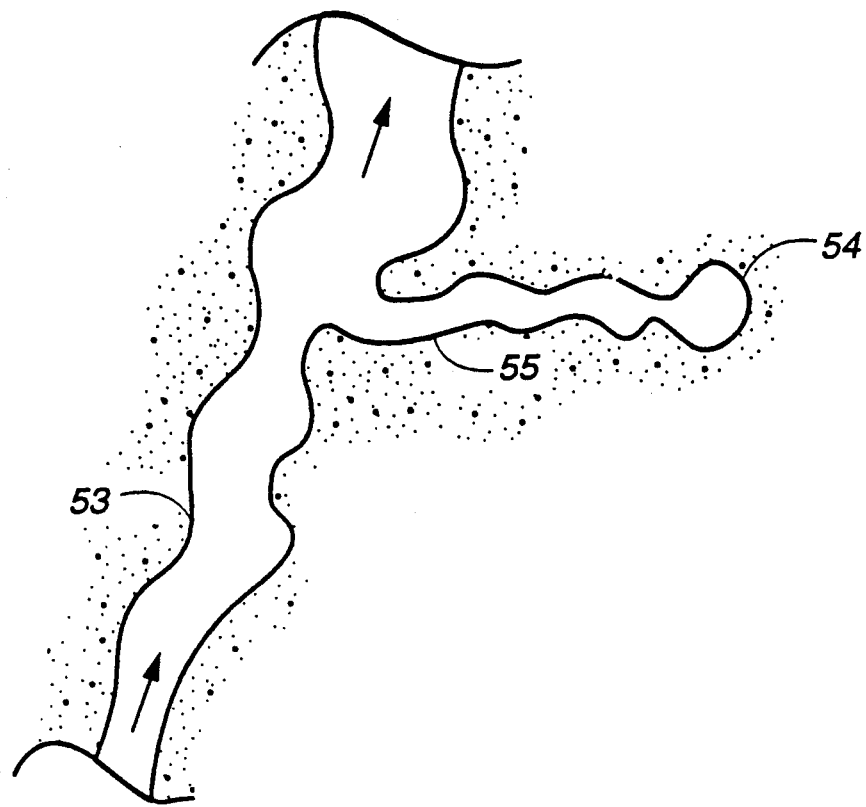
FIGS. 1 and 2 depict channels in a porous material such as soil.

A paper written by the inventor entitled "Soil Vapor Extraction Enhanced by Oscillatory Flow" is incorporated in full into this patent application. This paper was given at the Fifth National Outdoor Action Conference on Aquifer Restoration, Ground Water Monitoring, and Geophysical Methods, which was held in Las Vegas on May 13-16, 1991. The paper appears in the conference proceedings, which were printed by the journal "Ground Water Management."

Once spilled into the ground, a liquid organic pollutant may concurrently exist (1) as free liquid in pores of the soil, (2) sorbed onto the soil, (3) dissolved in interstitial water, and (4) as vapor in the soil gas. The physics of an SVE process are complicated by evaporation of interstitial water, by retreat of both aqueous and free product phases into smaller pores as extraction proceeds, by heterogeneity of the soil, and by the multiple organic compounds that may be present in a single spill. The concentration of vapor in the soil gas is initially low, being determined by the partial pressure of the contaminant in equilibrium with interstitial free liquid product, water, and sorbing surfaces. The concentration becomes lower as extraction progresses. Some hydrocarbons, such as gasoline, are composed of many separate chemical fractions; therefore, decreasing concentration of vapor in the soil gas may be due in part to early removal of those fractions having higher vapor pressures. The typical rate of extraction decreases from an initial peak to a long gently sloping plateau. If an SVE blower is temporarily stopped after the extraction rate becomes nearly constant, the extraction rate may be larger for a brief period after the blower is restarted. This restart pulse is generally interpreted as indicating that most of the air flow is confined to channels in the soil and, once the contaminant has been removed from those channels, the continuous extraction rate becomes limited by diffusion from remote pores of the soil to the flow channels. When flow is stopped, the concentration of contaminant in the flow channels increases until it equals the concentration in the soil pore gas, resulting in the brief increase in extraction rate when flow is again started. It has been suggested that intermittent cessation of extraction is a means of reducing operating costs while providing time for diffusion, although the overall total duration of the extraction operation is not decreased. This intermittent operation, where extraction would be stopped for time periods on the order of a day or more, is referred to as pulsed air flow.

This invention involves causing an oscillating movement of air in contaminated soil or superimposing an oscillatory component upon a steady air flow. By the term oscillatory flow, it is meant that subsurface air pressure is cycled with a period much less than the time required for the entire volume of soil gas to reach equilibrium with the contaminant. When the extracted gas is not in equilibrium with the soil, it is expected that oscillatory flow will increase the concentration in the extracted gas. If the amplitude of the oscillatory component of the pressure gradient is greater than the steady component, the area average flow velocity (often called the superficial velocity) will reverse for a portion of each cycle.

There are four mechanisms by which practice of the invention is expected to increase the rate of SVE above that when continuous flow or intermittent flow is used. The first rate mechanism is enhanced effective diffusion. Oscillatory flow in a small channel can increase the effective rate of diffusion of vapor through resident air in the channel. This enhanced transport is due to an oscillating core of slug flow in the center of the channel, with diffusion into and out of the slug at each cycle, to and from a thin boundary layer. The process is analogous to transporting water by a bucket brigade, in which the water moves from one end of the brigade to the other, but each worker swings back and forth at a fixed average position. The oscillating air in the channel is analogous to the swinging workers and the cyclic diffusion to and from the boundary layer is analogous to the passing of buckets from worker to worker. Strongly increased diffusion within soil due to oscillatory flow caused by wind-produced pressure fluctuations has been directly measured by at least one investigator and enhanced removal of water vapor has been ascribed to wind-induced pressure fluctuations by others. However, these measurements and the accompanying theoretical investigations were conducted before the boundary layer effect was recognized and explained. Referring now to FIG. 1, which depicts a flow channel 53, a closed pore 54, and a blind channel 55 running between flow channel 53 and closed pore 54, the closed pore is stagnant under conditions of steady flow in the flow channel, as shown by the arrows. With the entire pore stagnant, transport of vapor to the flow channel is by diffusion along the blind channel. Due to compressibility of the air, even a small oscillatory component of pressure in the flow channel will cause an oscillating air motion in the blind channel and closed pore. The effective rate of diffusion of contaminant from the closed pore to the flow channel will be enhanced by the small oscillatory flow in the blind channel. The oscillatory flow displacement needs to be only one-third or less of the volume of the blind channel and need not be comparable to the volume of the closed pore. The enhancement increases with frequency. In a channel of 1 mm radius and 20 mm length, a frequency of a few Hertz is required for a transport rate double that of ordinary diffusion. The enhancement of transport by this mechanism improves with higher frequency; however, oscillatory flow with frequency greater than one Hertz cannot penetrate a significant distance into tight soils. Therefore, the enhancement of transport by this mechanism is expected to be most beneficial for loose soils. Also, the enhanced diffusion may be very beneficial at the interface between a nearly impermeable layer (such as a clay lens) and an adjoining soil of high permeability. Therefore, oscillating flow may prove beneficial in a wider range of circumstances than just loose soils.

Figure 2:
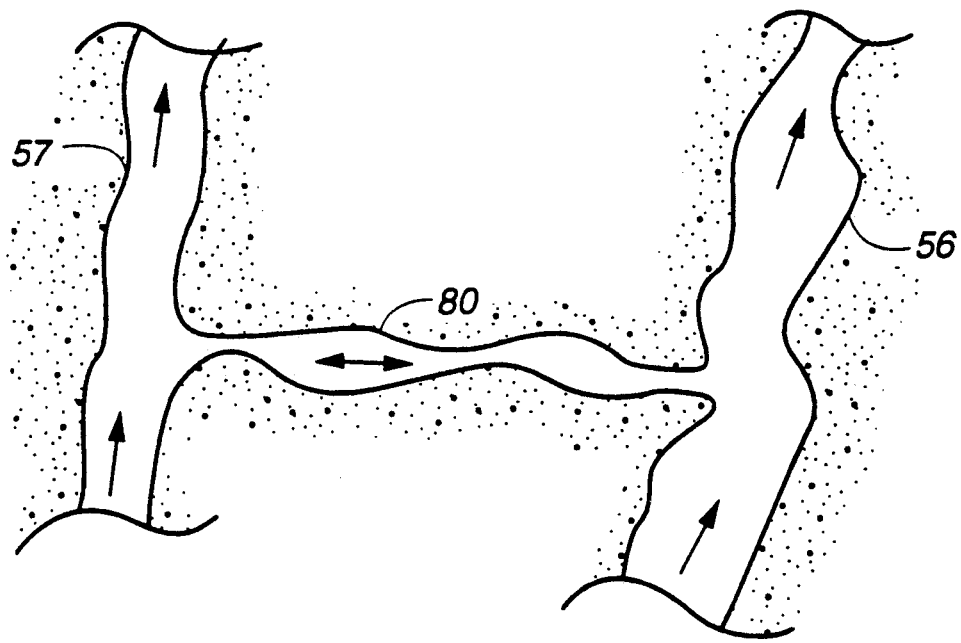

The second mechanism by which oscillatory pressure and flow may increase the rate of SVE is flow induced by a frequency dependent impedance. An oscillatory component of pressure will cause flow in regions that would remain stagnant under conditions of steady flow. For example, suppose the ends of channel 80, shown in FIG. 2, are at nearly equal pressure while there is steady flow through channels 56 and 57, as shown by the arrows. Almost no flow occurs through channel 80 at any rate of steady laminar flow through channels 56 and 57. However, the complex impedance to oscillatory flow is frequency dependent and, in general, is not equal to the zero-frequency resistance. Therefore, if the imposed flow has an oscillatory component, the oscillatory components of pressure at opposite ends of channel 80 will not have equal phase and magnitude, so that air will be pushed into and out of this otherwise stagnant location. Although the first mechanism will provide a separate benefit if the frequency is high enough, oscillatory flow of any frequency provides air motion for removal of the contaminant from channel 55 and thereby enhances vapor extraction.

The third mechanism is bulk oscillatory advection. If the amplitude of the oscillatory component of pressure equals a significant fraction of the steady component of pressure, a significant mass of air will be forced into and out of all soil pores each cycle. For example, if the pressure oscillates between 0.8 and 1.0 atm, approximately 20% of the air in the closed pore of FIG. 1 would be removed and replaced each cycle, carrying the pollutant vapor with it.

The fourth mechanism is pneumatic stimulation. Applying and releasing subsurface air pressure may force either periodic or permanent rearrangement of soil particles, thereby generating (either periodically or permanently) new or altered channels for flow. This process would be analogous to hydraulic stimulation which enhances production of oil wells and a process which is being developed to extract heat from dry geothermal reservoirs.

Figure 3:
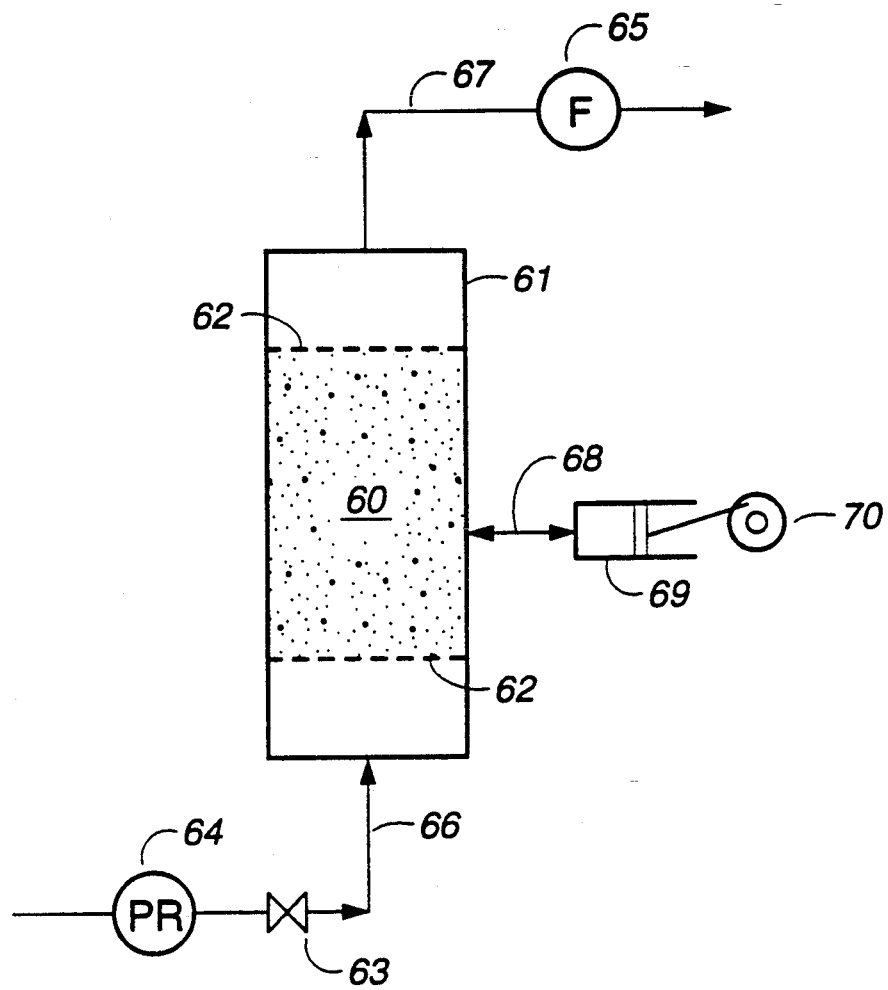
FIG. 3 depicts experimental apparatus used in proof of principle testing.

Preliminary proof of principal experimentation was conducted. FIG. 3 depicts, in schematic form, the apparatus which was used. A 75 cm long column of sand 60 was placed in a 1.0 m long pipe 61 having an inside diameter of 20 cm. The pipe was mounted vertically and the sand was retained in the pipe by screens 62 at each end. The unoccupied volume at the inlet end of the column served to distribute the air flow over the cross-section of the column. Ports in the pipe (not shown) were located at 5 cm intervals for use in gas sampling, air injection, pressure measurement, etc. Compressed air with a dewpoint of less than $-20°$ C. was provided to the bottom of the column by conduit 66. passing through pressure regulator 64 and metering valve 63. Air flowed out of the top of the column via conduit 67, passing through integrating flowmeter 65. A cold mirror dewpoint instrument (not shown) was used to measure dewpoint of the air stream at the inlet, outlet, and intermediate points of the column. Oscillation was provided initially by moving the handwheel of valve 63 back and forth by means of a motor and connecting rod mechanism (not shown) and later by means of a reciprocating piston and cylinder 69, which was actuated by drive 70. The cylinder communicated with the interior of pipe 61 via conduit 68 and an extension (not shown) of conduit 68 into the sand. The piston provided opposing oscillatory flows toward both ends of the column from the middle.

Figure 4:
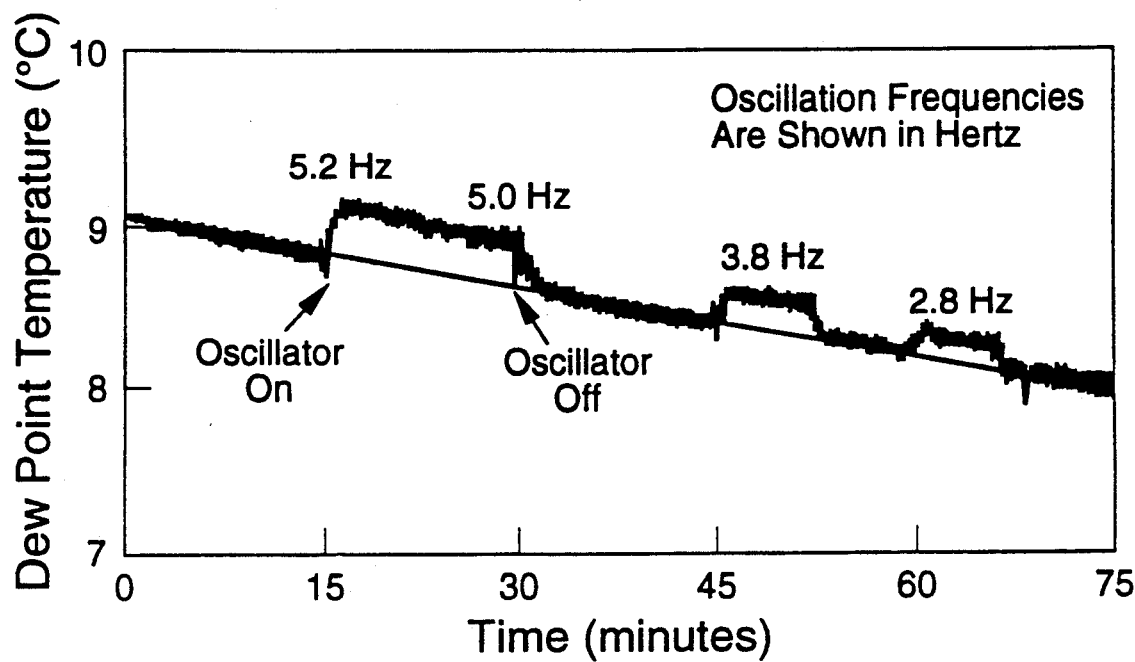
FIG. 4 is a reproduction of data gathered using the apparatus of FIG. 3.

For experimental convenience, water was chosen as the surrogate contaminant. To prepare the column for experimentation, approximately 4 liters of water were poured into the top of the column and the bottom was allowed to drain for several days, leaving the column at field saturation. At steady air flow rates typical of soil vapor extraction (superficial velocity approximately 0.1 cm/s), the air reached equilibrium with the water in the sand within a distance of less than 10 cm. This was true even when the sand was nearly dry and the equilibrium dewpoint of stagnant soil gas was less than $10°$ C. Thus, as extraction proceeded, the sand in the bottom of the column became very dry, while that a short distance above was still at field saturation, as indicated by a dewpoint equal to the dry bulb temperature. In retrospect, sand was a poor choice for exploratory experiments because it permitted nearly uniform rather than channeled flow. For the extracted air to be other than at equilibrium, we had to increase the steady superficial velocity to 0.25 cm/s when only sand in the top several centimeters of the column still held appreciable moisture. Under these conditions, the equilibrium dewpoint could decrease several degrees centigrade during an hour, causing the dewpoint in the extracted air to decrease with time. When the extracted air was not in equilibrium with the sand, and only under this condition, oscillatory flow caused a marked rise in the dewpoint at the outlet of the column, as shown in FIG. 4. Under the conditions of FIG. 4, oscillatory flow increased the water vapor concentration in the extracted air by one-third to one-half the difference between the steady flow value and the equilibrium value. Only the sand at the exit end of the column contained moisture when nonequilibrium conditions were achieved. Being adjacent to a volume at nearly constant pressure, this sand was exposed to oscillations in air velocity but only to minor oscillations in pressure.

Information on the invention is presented below by means of examples illustrated by the drawings. Certain reference numbers used in the Drawings are repeated where the functions of the apparatus is similar.

Figure 5:
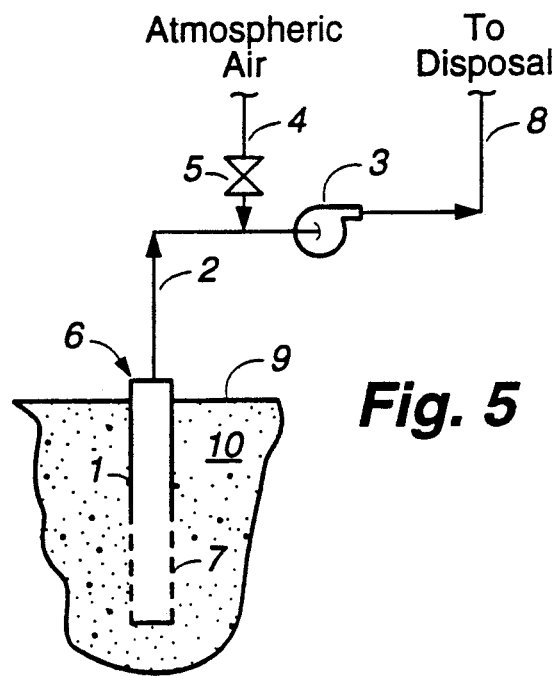
FIGS. 5 through 10 are schematic diagrams depicting apparatus arranged for use in practice of the invention.

FIG. 5 depicts apparatus for practice of a basic embodiment of the invention. Vacuum source 3 is connected to well 6 by means of conduit 2. Well 6 is bored in a location 10 where the soil is contaminated by one or more volatile materials. Well 6 has a portion of solid casing 1 which extends a distance into the soil from ground surface 9 and a portion of porous casing 7, which may be perforated pipe or any of the common types of screen material commonly used for a porous well casing. It is intended that well 6 represent one or more than one well which are connected to the suction port of vacuum source 3 by means of piping. The casing of well 6 may consist of more than one solid section and more than one porous section. Sand, gravel, concrete, and other materials may be used in the construction of the well, as is known by those skilled in the art. Porous sections of casing are placed in contaminated soil from which volatile substances are to be removed and solid casing is placed adjacent to uncontaminated soil. Gas is discharged from vacuum source 3 through conduit 8, which conducts the gas to means for cleaning gas before ultimate discharge of gas into the atmosphere. In certain cases, it may not be necessary to clean the gas stream and it may be discharged directly from conduit 8 into the atmosphere. Vacuum source 3 reduces the pressure in well 6 in order to pull vapors of volatile substances from the soil. A typical pressure developed in the well when the invention is not practiced is 20 in. of water vacuum. In order to practice this embodiment of the invention, atmospheric air is periodically added to conduit 2 at a point near the suction port of vacuum source 3, passing through conduit 4 and valve 5. In order to establish a periodic cycle of pressure variation, valve 5 is cycled opened and closed. Where a base pressure of 20 in. of water vacuum is effective to remove volatile substances, valve 5 is opened periodically so that the pressure drops to 15 in. of water vacuum and then closed so the pressure returns to 20 in. of vacuum. This periodic cycling will increase the rate of contaminant removal. Each cycle consists of a time period starting when valve 5 starts to open, ending when valve 5 again starts to open, and including a time period when valve 5 is completely closed. Alternately, a sinusoidal cycle may be used. For example, a base value of 20 in. water vacuum may be chosen and the pressure varied between 15 and 25 in. water. The apparatus would be chosen and manipulated so a plot of pressure versus time will show a sinusoidal curve. There are numerous other methods of varying the pressure in well 6, instead of using an air bleed, which are well-known to those skilled in the art. Gas flowing through conduit 2 and vacuum source 3 will contain both air and vapors of the volatile material with which the soil is contaminated. The quantities of each will vary widely, depending on several factors including the porosity of the soil. With relatively non-porous soil, the quantity of air drawn into the soil from the atmosphere and then through the porous well casing will be small. If the soil is relatively nonporous and an air-impervious barrier is placed on the surface of the earth around the well, the amount of the air and the gas stream flowing through vacuum source 3 will be smaller.

Figure 6:
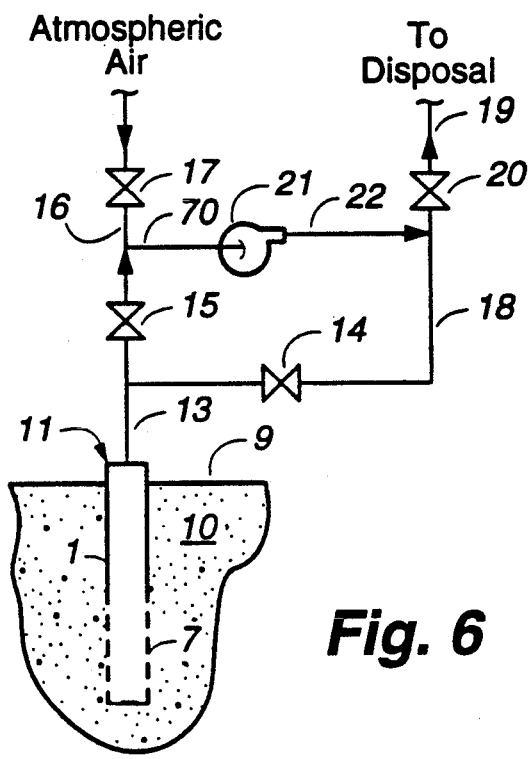

FIG. 6 depicts a well 11 in which pressure can be reduced by means of blower 21 in order to cause air and a volatile substance contaminating the earth around the well to flow out of the well via conduits 13 and 70. From blower 21, the air and volatile substance mixture flows to means of disposal via conduits 22 and 19. While this flow is taking place, valves 15 and 20 are open and valves 14 and 17 are closed. In order to enhance removal of volatile substance from the earth surrounding the well by means of an embodiment of the invention, valves 15 and 20 are periodically closed while valves 17 and 14 are opened so that air can flow from the atmosphere to the suction port of blower 21 via conduits 16 and 70 and then into the well via conduits 22, 18, and 13. This cycle of pulling on the well and then blowing air into the well is continually repeated.

Figure 7:
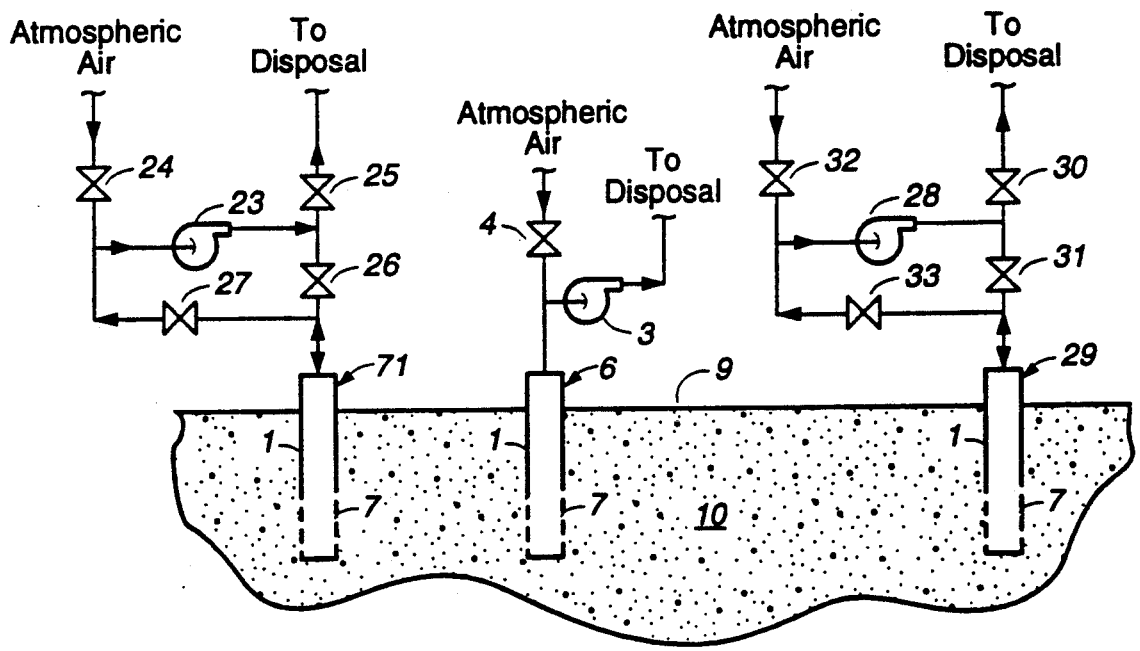

The apparatus depicted in FIG. 7 may be used to practice several embodiments of the invention. As in the other figures, well 6 represents one or several wells of a similar type and there may be one or many of the wells depicted by reference numbers 29 and 71. Vacuum source 3 removes air and vapor from well 6 in the same manner as was discussed above. Atmospheric air may be bled into the suction port of vacuum source 3 through valve 4 as discussed above in order to provide oscillatory flow. In one embodiment, blower 23 provides atmospheric air to well 71 via valves 24 and 26 and the associated conduit. Air flows through soil 10, picking up volatile substances, to well 6. The flow rate of air into well 71 will be varied, or oscillated, by means known to those skilled in the art, such as adjustment of inlet vanes (not shown) associated with blower 23 or manipulation of values. Flow will be continuously maintained but the rate of flow will be varied in a periodic cycle in order to distribute the air throughout the interstices of the porous soil. Blower 28 may be used to provide air to well 29 in oscillatory fashion in the same manner as air is provided to well 71 so that soil between well 29 and well 6 is treated.

FIG. 7 may be referred to in the explanation of another embodiment of the invention. In this embodiment, only wells 71 and 29 are used; well 6 is not used. Air is provided to well 71 by means of blower 23 as described above. Gas consisting of air and vapor of a volatile substance is removed from well 29 by means of blower 28, valves 33 and 30 being open and valves 32 and 31 being closed. After a period of time which constitutes a half cycle, the functions of blowers 23 and 28 are reversed. Blower 28 is used to provide air to well 29 via valves 32 and 31, with valves 30 and 33 being closed. Gas consisting of air and vapor is removed from well 71 by blower 23. Thus, a complete cycle consists of two modes of operation, a first mode where air is injected into well 71 and gas is removed from well 29 and a second mode in which air injected into well 29 and gas is removed from well 71. The frequency of the cycles may vary, in this embodiment and all other embodiments, from about 0.001 to about 60 cycles per minute, yielding cycle times varying from 1 second to 1 day. Long cycle times are expected to be effective in tight soil such as clay and short cycle times would be used when the mass of porous materials is small. The air flow may be varied in a sinusoidal manner.

Figure 8:
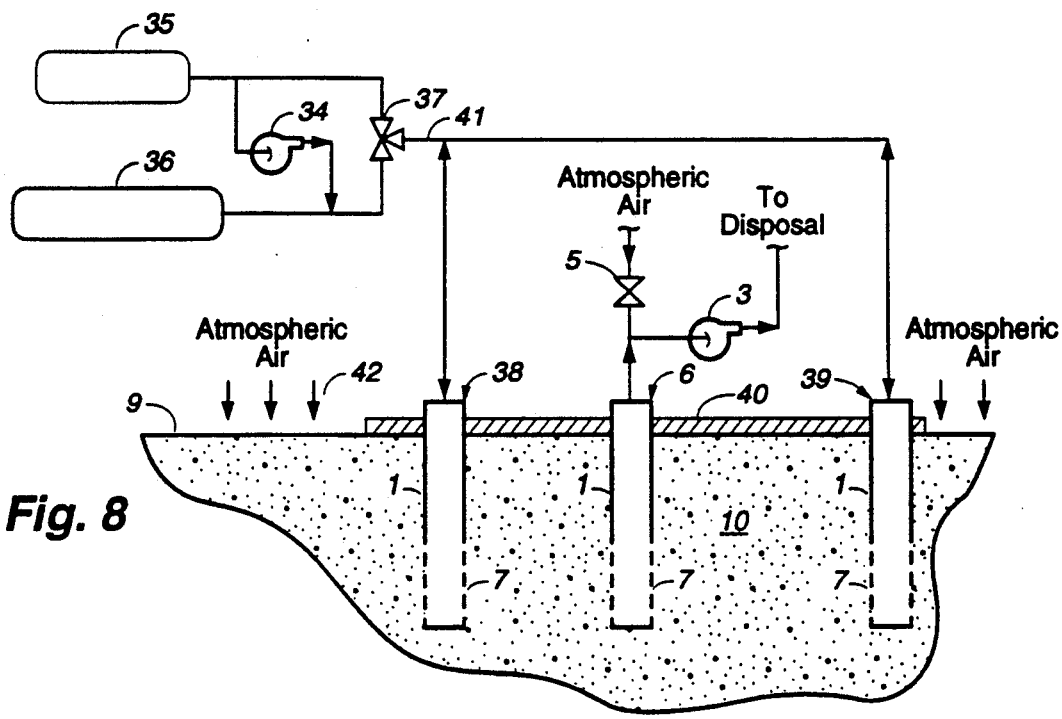

In the embodiment of the invention which may be practiced using the apparatus depicted in FIG. 8, vacuum source 3 removes air and vapor from well 6 and, if desired, the pressure in well 6 may be varied by cycling valve 5 open and shut. In this embodiment, an oscillatory component of pressure and flow is provided to the porous soil by use of wells 38 and 39. Blower 34 operates continually to withdraw air from vacuum tank 35 and to deliver air to pressure tank 36. Those skilled in the art can easily specify the sizes of the tanks and provide the controls, pressure relief valves, vacuum breakers, etc. required in the system. Three-way valve 37 is a two-position valve which is cycled between a first position to connect vacuum tank 35 to wells 38 and 39 via conduit 41 and the other conduits which are shown in FIG. 8 while pressure tank 36 is blocked in and a second position to connect pressure tank 36 to wells 38 and 39 while vacuum tank 35 is blocked in. In this manner, the flow rate of gas through the earth from wells 38 and 39 to well 6 is caused to vary in a periodic cycle where the gas flow rate is equal to a base flow rate at the beginning and the end of each cycle. Arrows such as the arrow indicated by reference number 42 depict air flowing into the soil from the atmosphere as a result of the operation of the apparatus. An impermeable barrier 40 is provided to prevent air from the atmosphere from short circuiting portions of the contaminated soil.

Figure 9:
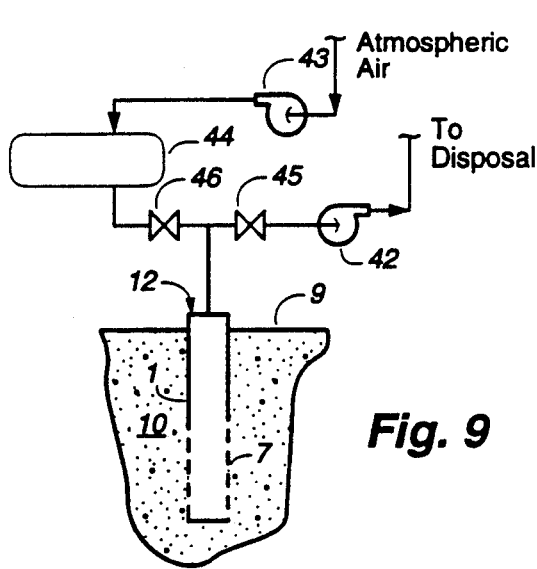

FIG. 9 depicts a well 12 from which blower 42 will remove gas. Pressure tank 44 is utilized to vary the pressure in well 12 in a similar manner to that explained in regard to the pressure tank of FIG. 8. The pressure in the well is periodically increased by allowing the air in the pressure tank to flow into the well. Blower 43 pressurizes tank 44 using atmospheric air while valve 46 is closed. At intervals, valve 45 is closed and valve 46 is opened in order to allow air to flow from tank 44 to well 12. Then valve 46 is closed and valve 45 is opened so that the tank may be repressurized and the cycle repeated.

Figure 10:
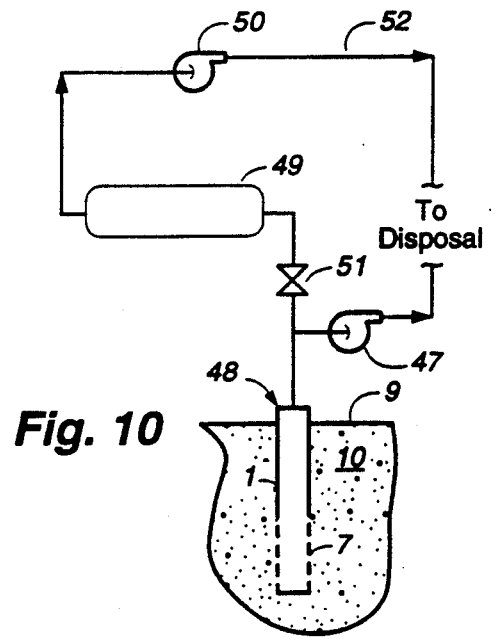

FIG. 10 is an embodiment in which a vacuum tank similar to that of FIG. 8 is utilized. Blower 47 continuously removes gas from well 48. Blower 50 creates a vacuum in vacuum tank 49 while valve 51 is closed, with the gas removed from tank 49 being discharged to atmosphere or other means of disposal via conduit 52. Valve 51 is periodically opened to decrease pressure in the suction piping of blower 47 and the well to a value less than the pressure resulting from the operation of blower 47 alone, thus providing an oscillating flow. Alternatively, the tank may be connected to the well rather than to the suction piping of blower 47.

Those skilled in the art are able to design and specify equipment and controls for the practice of the invention as described herein. For example, those skilled in the art will provide blowers of different designs depending on whether the blower is primarily used to provide a pressure less than atmospheric at its suction or to provide primarily a pressure greater than atmospheric at its discharge port. As alternates to blowers, a generic term which includes vacuum pumps and compressors, other apparatus may be used to provide the oscillating flows of this invention. This apparatus includes, for example, mechanically operated bellows, bladder pumps (actuated by compressed air), and engine-driven pistons having intake and exhaust valves. In use of the invention in connection with SVE, the inventive process can be applied to masses of soil which have been excavated and, where soil contamination is near the surface, by substituting trenches for the wells discussed herein. The invention may be applied to porous materials which are not homogenous. It is not necessary to specify numeric flow rates herein, as the invention is applicable to all steady pressures and flow rates which are effective and those skilled in the art can determine pressures and flow rates suitable for various applications. The invention will be useful where it is desired to coat the interior of a porous body with a substance; the substance may be suspended in the gas in the form of tiny particles or drops. Also, the gas distributed throughout the interstices of a porous material may be comprised of volatile substances.

What is claimed is:

1. A method of distributing gases throughout the interstices of porous materials consisting of flowing a gas through a porous mass of material and varying the gas flow rate in a series of predetermined periodic cycles, where the frequency of said cycles is from about 0.001 to about 60 cycles per minute.

2. The method of claim 1 where said gas flow rate is varied in a sinusoidal manner.

3. A method for removing volatile substances from the interstices of porous materials by reducing the pressure within a mass of porous material to a base value which is effective to remove volatile substances and varying said pressure in a series of predetermined periodic cycles, where said pressure is equal to said base value at the beginning and end of each cycle, and where the frequency of said cycles if from about 0.001 to 60 cycles per minute.

4. The method of claim 3 where said pressure is varied in a sinusoidal manner.

5. A method for removing volatile substances from the interstices of porous materials consisting of:
   a. reducing the pressure within a mass of porous material in order to cause gas comprised of said volatile substances to flow out of said porous material;
   b. preventing said gas comprised of volatile substances from reentering said porous material;
   c. flowing a gas into said porous material, thereby increasing the pressure within said porous material; and
   d. continuously repeating a cycle consisting of steps a., b., and c., where the frequency of said cycle is from about 0.001 to about 60 cycles per minute.

6. In a process for removing volatile substances from the interstices of porous materials by flowing a gas through a porous mass of material, the improvement consisting of establishing a base gas flow rate which is effective to remove volatile substances and varying the gas flow rate in a series of predetermined periodic cycles, where the gas flow rate is equal to the base rate at the beginning and end of each cycle, where the frequency of said cycles is from about 0.001 to about 60 cycles per minute.

7. The method of claim 6 where said gas flow rate is varied in a sinusoidal manner.

8. In a process for removing volatile substances from the interstices of porous materials by flowing a gas through a porous mass of material, the improvement consisting of varying the direction of said flow in a continuous series of predetermined periodic cycles, where the frequency of said cycles is from about 0.001 to about 60 cycles per minute, alternating between a first mode of operation and a second mode of operation, where said first mode consists of adding gas to the porous material at a first set of at least one locations and removing gas from the porous material at a second set of at least one locations, where said second mode consists of adding gas at said second set of locations and removing gas at said first set of locations, and where one of said cycles consists of operations in both of said modes.

* * * * *